Dec. 23, 1952 A. B. NEWTON 2,622,390
CONTROL APPARATUS, INCLUDING AN AUXILIARY POWER
RECOVERY TURBINE FOR TURBO-SUPERCHARGED ENGINES
Filed Feb. 28, 1946 4 Sheets-Sheet 1

INVENTOR
ALWIN B. NEWTON

BY George H. Fisher
ATTORNEY

Patented Dec. 23, 1952

2,622,390

UNITED STATES PATENT OFFICE 2,622,390

CONTROL APPARATUS, INCLUDING AN AUXILIARY POWER RECOVERY TURBINE FOR TURBO-SUPERCHARGED ENGINES

Alwin B. Newton, Dayton, Ohio, assignor to Minneapolis-Honeywell Regulator Company, Minneapolis, Minn., a corporation of Delaware Application February 28, 1946, Serial No. 651,007

8 Claims. (Cl. 60—13)

1

This invention relates generally to improvements in power plants of the internal combustion type and particularly as commonly employed for aircraft.

The invention has particular reference to the utilization of normally wasted power of internal combustion engines, as represented by the discharge of the exhaust gases as waste to the atmosphere. It is, of course, common practice to use a part of the power present in the exhaust gas flow for the operation of the turbine driving the supercharging compressor which supplies the air for combustion to the engine, and it is for use with power plants of this design that my invention is best adapted.

I am aware of the fact that previous attempts have been made to successfully embody in a power plant a means for using the power of the exhaust gases, over and above that necessary for operating the turbo-supercharger, but it is the primary object of my present invention to provide an improved system or apparatus for this purpose, of a practical nature and well adapted to use in connection with the various controls necessary in such installations.

Another object is to provide improved control mechanism or systems for this purpose which afford the precision in adjustments necessary to prevent the building up of excessive exhaust back pressures on the engine, which would reduce the power thereof and defeat my purpose, and to prevent robbing the turbo-supercharger of the power necessary to adequately supply the engine with air for combustion, which would have the same effect.

Still another object is to provide improved means for utilizing the power recovered in this manner to augment the power or the work done by the engine itself.

Figure 1:
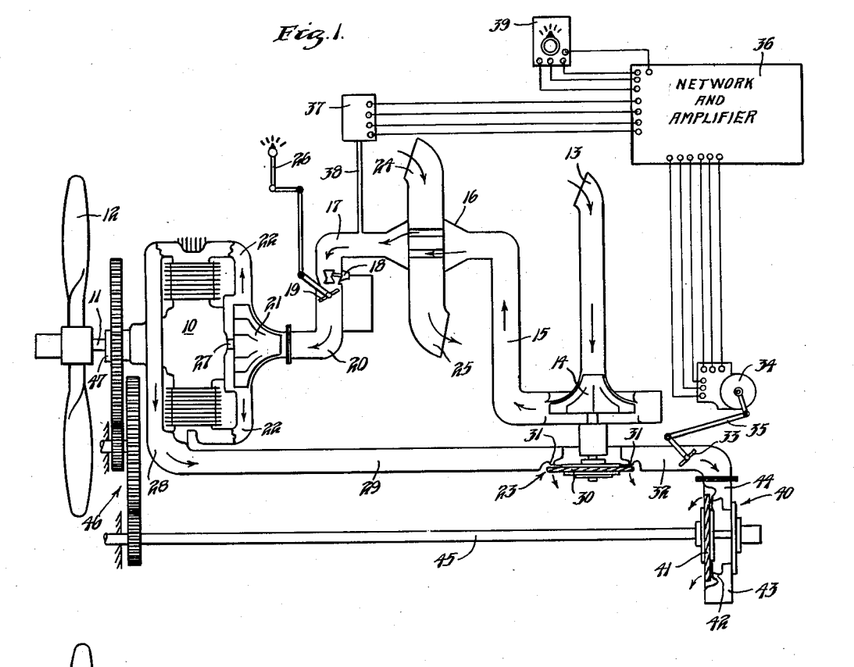
Figure 1 illustrates diagrammatically the application of one form of my power recovery system to an internal combustion aircraft engine, having conventional turbo-supercharger and other control elements.

These and other objects I attain in the manner now to be set forth and claimed and in the course of the description reference is had to the accompanying drawing wherein:

Figure 1

Referring now more particularly to Figure 1 of the drawing, I have illustrated therein, in a diagrammatical fashion, a complete aircraft power plant including an internal combustion engine 10 having a power shaft 11 driving a propeller 12. Air for supporting combustion in the engine 10 is taken through an intake 13 and passes through a compressor 14, a conduit 15, an after cooler 16, a conduit 17, a carburetor 18, a throttle 19, a conduit 20, a second compressor 21 and through an intake manifold system 22 into the engine. The compressor 14 is driven by a gas turbine 23 and together therewith forms a unit commonly known as a turbo-supercharger. The after-cooler 16 removes the heat of compression of the air supplied by compressor 14 and for this purpose receives fresh air through an intake 24, passes it in heat exchanging relation to the air flowing toward the engine, and finally discharges the cooling air from an outlet 25. The carburetor 18 mixes fuel with the air while the throttle 19 controls the supply of the combustible mixture thus formed, being here shown as adjusted by a hand control 26.

The compressor 21 is directly driven from the engine as indicated at 27 and in addition to adding compression to the gas mixture aids in distributing such mixture to all cylinders of the engine.

The supercharger compressor 14 is of the centrifugal type in which the rate of compression varies in accordance with its speed. The speed at which the turbine 23 operates thus controls the compression, or the pressure of the air supplied to the engine.

The turbine 23 is powered by exhaust gas from the engine 10, these gases being led from an exhaust manifold 28 of the engine through a conduit or duct 29 and discharged to impinge the buckets on the turbine wheel 30 through a nozzle ring 31, the gases thus used being delivered through the wheel to atmosphere as indicated. There is also conventionally provided a discharge duct or outlet 32 in which is located a damper-like throttle valve 33. As the valve 33 is opened the gases may flow past it with less resistance than presented by the turbine and thus the position of this valve precisely controls the amount of the gases diverted through the turbine, and the operating speed of the turbo-supercharger unit as a whole.

The valve 33 is positioned by a reversible electric motor 34 through the linkage designated generally at 35 and the motor is in turn controlled and energized by an impedance network and electronic amplifier 36 under the primary control of a pressure sensing controller 37 connected by a duct 38 to the conduit 17, and a manually adjustable pressure selector 39. This entire control system may be similar to that disclosed in Daniel G. Taylor Patent No. 2,388,350, issued November 6, 1945. The system is also shown and described in greater detail in connection with Figure 5. So far as the invention of Figure 1 is concerned, it may be simply stated that the amplifier 36 operates to adjust the valve 33, through the motor 34, to set the operating speed of the turbo-supercharger units 14—23 to provide for the supply of air to the engine of a pressure called for by adjustment of the manual selector 39, and maintains this selected pressure under control of the pressure responsive controller 37.

As thus far described, it will be understood that the turbine 23 uses but a part of the power or energy present in the exhaust gases discharged by the engine. This power, in excess of that required for the operation of the turbo-supercharger, is ordinarily wasted and it is the purpose of my invention to provide practical means for using this otherwise lost power.

To this end I provide a second or auxiliary gas turbine 40 having a bucketed wheel 41, a nozzle ring 42, a nozzle box 43 and an intake duct 44 opening into said box. As here shown, the intake of this second turbine 40 is connected to the outlet 32 of the first turbine 23, on the downstream side of the valve 33. The turbine 40 thus receives exhaust gases not used by the turbine 23 and it will be obvious that the power present in these excess gases is utilized by the second turbine without materially interfering with the normal operation of the first.

The second or auxiliary turbine 40 may be used to drive any load device, or mechanism requiring power rotation but I prefer, as shown in the drawing, to use the recovered power to assist the engine 10 itself in its work. For this purpose the turbine 40 has its shaft 45 connected through a gear train 46 to the shaft 11 driving the propeller 42. On the shaft 11 an over-running clutch, designated generally at 47, of any conventional form, is placed and it selectively connects the gear train to this shaft. As thus arranged, the turbine may exert a driving force upon the shaft 11, augmenting the power of the engine, but should the shaft be running at a greater speed than the end speed of the gear train 46, the over-running clutch will allow the shaft to turn free of the gears. The latter condition may occur in starting the engine, or when the demand on the turbo-supercharger is such that the turbine 23 is using a large part of the total volume of the exhaust gases, leaving little for driving the second turbine 40.

Figure 2:
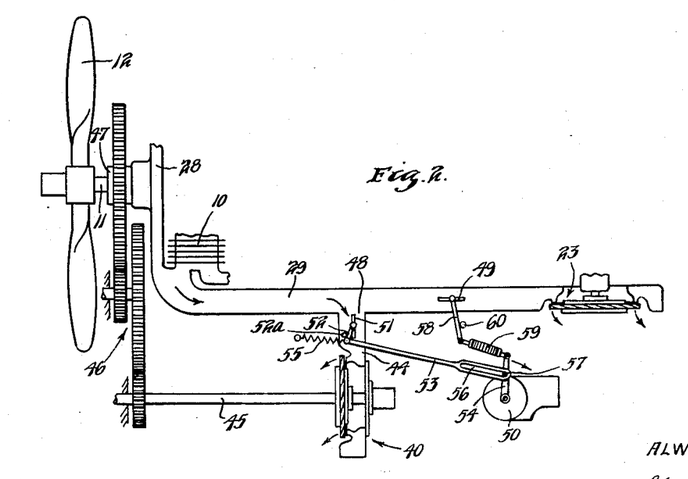
Figure 2 illustrates a slight modification of the system of Figure 1.

Figure 2

In Figure 2, I illustrate an alternative arrangement of the system of Figure 1 wherein corresponding parts are given the same reference numbers, and wherein the auxiliary or second turbine 40 has its intake 44 connected at 48 to the exhaust conduit 29 between the engine 10 and the turbine 23 of the turbo-supercharger. In lieu, then, of the valve 33 previously described, a throttle or throttle valve 49 is arranged in the exhaust conduit 29 and is connected for operation by a motor 50 similar to that indicated above at 34 and controlled in a similar manner. The position of this throttle 49 will obviously vary the admission of the exhaust gases to the turbine 23 and as the throttle is closed it will reduce the volume of the gases thus used and divert an increasing volume into the inlet of the auxiliary turbine 40.

Another throttle or throttle valve 51 is provided in the intake 44 and its operating arm 52 is connected through a link 53 to a crank arm 54 swung by the motor 50. A spring 55 normally urges this second throttle 51 toward the open position shown against a stop 52a and the link 53 has a longitudinal slot 56 receiving a pin 57 by which it is connected to the crank arm 54. The crank arm 54 is connected to an operating arm 58 on the throttle 49 by a spring link 59 which may expand after the throttle 49 is fully opened, in which position the arm 58 comes to rest against a stop 60.

This linkage arrangement is such that the throttle 49 will first move to the full open position shown, with the throttle 51 full open, whereupon a further demand for supercharging of the engine will cause the motor 50 to continue in operation, attempting to further open throttle 49. At this time the arm 58 is against the stop 60 and the spring link 59 can only lengthen. But the pin 57, having previously moved along the slot 56 without affecting throttle 51, now reaches the end of the slot and such continued movement of the arm 54 will now pull on the link 53 moving throttle 51 towards closed position. Thus, the demand for increased supercharger output is met by a diversion of a greater volume of the exhaust gases to the turbine 23, reducing the output of turbine 40. The reverse sequence of operation takes place as the demand on turbine 23 decreases, the throttle 51 first opening wide and then the throttle 49 gradually closing.

It will be apparent then that the auxiliary turbine 40 which, as shown, drives the propeller shaft 11 through the gear train 46, uses only that part of the total volume of exhaust gases not required by the turbine 23 for supercharging the engine and thus interferes in no way with proper maintenance of induction system pressures.

Figure 3:
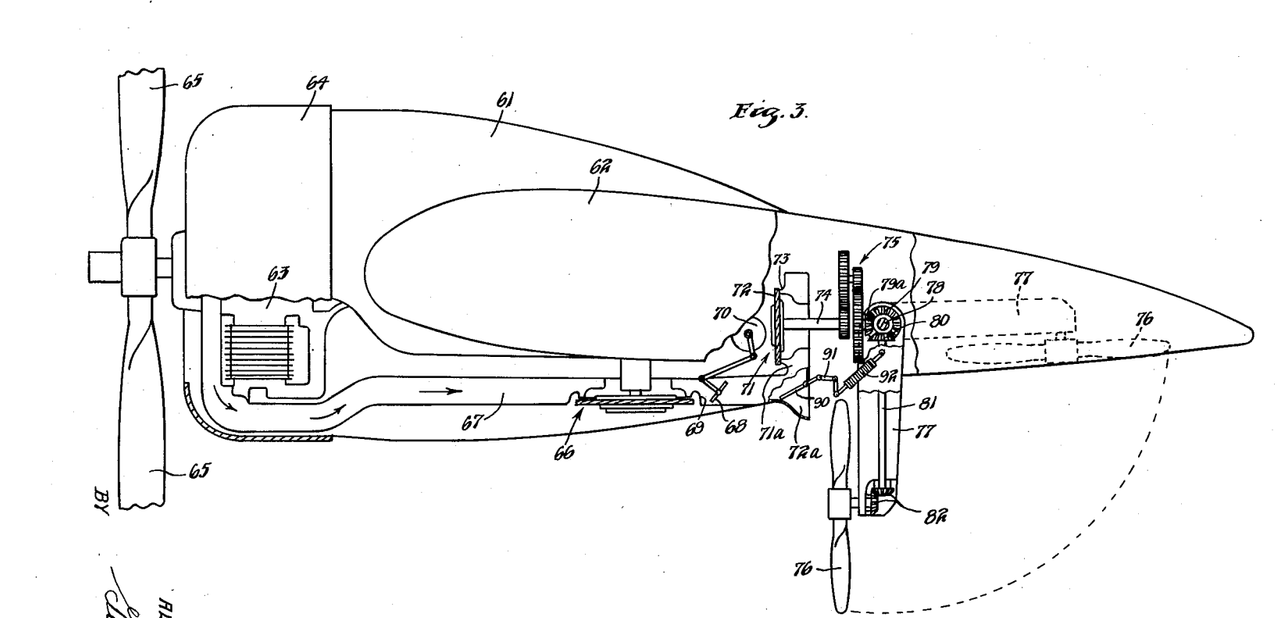
Figure 3 is a diagrammatical showing of another modification of my power recovery ideas, illustrating the use of an auxiliary propeller for using the recovered power.

Figure 3

For convenience in the illustration and description of this modification of my invention, I have shown the power plant as arranged in the conventional engine nacelle 61 on a wing 62 of a multi-engine aircraft, although it is to be understood that my invention may be adapted also for use upon single engine aircraft in which the power plant is arranged in the fuselage.

Only a part of the power plant is here shown, including an engine 63 arranged within a cowling 64 of the nacelle and arranged to drive a propeller 65. The turbine 66 of the turbo-supercharger is indicated as connected to an exhaust gas duct 67 and the speed of the turbine is controlled by a waste gate 68 located in an outlet 69 in the manner previously described, this waste gate being positioned by the reversible motor 70 controlled in the same manner as motor 34 of Figure 1.

To make use of the power present in the exhaust gases not used by the turbine 66, I provide a second auxiliary turbine 71 having an intake 71a connected to the outlet 69 aforesaid. The bucketed wheel 72 of the turbine 71 is arranged for rotation by exhaust gases directed thereagainst by a nozzle ring 73 and has its shaft 74 arranged to drive a gear train, indicated generally at 75. Obviously, the turbine 71 will thus utilize whatever volume of the exhaust gases is not needed by the turbine 66 and will rotate the gear train 75 at a speed depending on the relative demands of the supercharger, as called for by the control system, supplying engine 63 with air for combustion.

To utilize the power thus secured, I here provide an auxiliary propeller 76 which is journaled at the end of a swinging arm structure 77, pivotally mounted at 78 in the wing 62. The end gear train 75 is a bevel gear 79a which meshes with and drives a bevel gear 79. Bevel gear 79 is, in turn, constantly meshed with a bevel gear 80 at the end of a drive shaft 81 extending along the length of the arm structure 77, and at its outer end the shaft 81 drives the propeller 76 through similar beveled gears 82. The arrangement of the swinging arm structure 77 is such that normally the auxiliary propeller 76 may be retracted or swung rearward and upward into a cavity in the underside of the wing 72 near its trailing edge, as indicated by the dotted lines. When it is desired to put the auxiliary propeller 76 into operation, as when the conditions are such that the auxiliary turbine 71 may be expediently put into operation to recover the power lost in excess exhaust gases, the arm structure 77 may be swung downward and forward to the full line position at which the propeller 76 will be supported beneath the wing and in the air stream. Any suitable conventional retraction gear (not here shown) may be arranged in connection with the arm 77 for operating it as described.

Gears 79, 79a, and 80 will remain in engagement at all times. Consequently, it is necessary to provide some means for preventing the turbine 71 being driven when the propeller 76 is in retracted position. To accomplish this, I have provided a selectively positionable flap valve 90 which, as will be obvious from the drawing, may be arranged to connect the outlet 69 with either the turbine 71 or with an outlet 72a to the atmosphere. In the position shown, the flap valve 90 is in its lowermost position in which the outlet 72a is closed and all of the gas leaving the outlet 69 passes to the turbine 71. The flap valve 90 is automatically operated by the retraction movement of the auxiliary propeller 76 by means of a bell crank lever 91 connected at one end to the valve 90 and connected at its other end through a spring link 92 to the arm 77 below its pivot 78. The arrangement, as illustrated, is obviously such that when the propeller 76 is swung to operative position the link 92 will oscillate the bell crank 91 and move the flap valve 90 to the position shown in the drawing at which it closes off the outlet 72a and connects the intake 72 with the exhaust gas outlet 69. On the other hand, when the arm 77 is swung upwardly and rearwardly to retract the auxiliary propeller 76, the initial movement will pull upon the link 92 to oppositely operate the bell crank lever 91 and move the valve 90 upwardly to a position in which the turbine 71 is isolated from the exhaust gas outlet 69 and the exhaust gas outlet 69 is connected through outlet 72a to the atmosphere. This will result in all of the exhaust gas leaving the turbine 66 being by-passed to atmosphere so that the wheel 72 of the turbine 71 ceases to turn. Further movement of the arm 77 toward its retracted position will have no other effect than simply to stretch the spring link 92. While I have shown the auxiliary propeller 76 as located in a position in which it would be within the slip stream of the main propeller 65, it is to be understood that the auxiliary propeller 76 can be located outside of the slip stream. This is particularly desirable in the case of high altitude flight where larger effective disk area is desired.

It is to be understood, of course, that the auxiliary turbine 71 may, if desired, receive gases from more than one engine, each separately controlled.

Figure 4:
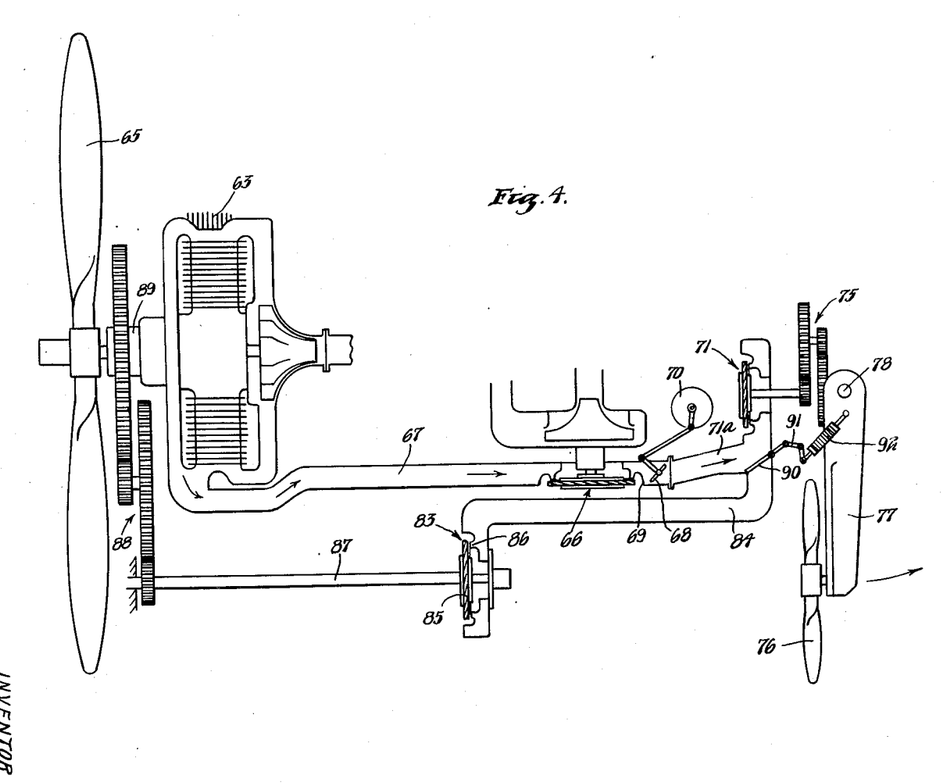
Figure 4 is a similar view, with some parts omitted, showing a slight modification of the system of Figure 3 for using the recovered power.

Figure 4

In this view, I illustrate a modification of the system shown in Figure 3, but wherein the engine 63, propeller 65, turbine 66, exhaust duct 67, waste gate 68, outlet 69 and motor 70 are all identical with the previous description. There is also provided the second auxiliary turbine 71 driving the gear train 75 and powering the auxiliary propeller 76 supported on its arm 77 in exactly the same manner.

Here, however, I provide a third auxiliary turbine, designated generally at 83, having an intake conduit 84 leading to a junction with the intake 71a of the second turbine 71. The turbine 83 includes a bucketed wheel 85 against which the exhaust gases are caused to impinge through a nozzle ring 86 and this turbine drives the main propeller 65 through a shaft 87 and gear train 88 in the same manner as that previously described with reference to Figures 1 and 2. An over-running clutch 89 is provided between the gear train 88 and the main propeller 65 to disconnect the gear train from the propeller when the engine speed exceeds the terminal speed of the gear train.

The junction between the respective auxiliary turbine intakes 72 and 84 is provided with a selectively positionable flap valve 90 corresponding to flap valve 90 of Figure 3. The flap valve 90 is arranged in this modification to connect the outlet 69 with either of the turbines. This valve 90 is automatically operated by the retraction movement of the auxiliary propeller 76 by means of bell crank 91 connected at one end to the valve 90, and connected at its other end through a spring link 92 to the arm 77 below its pivot 78, just as in Figure 3. The arrangement as illustrated is obviously such that when the propeller 76 is swung to operative position the link 92 will oscillate bell-crank 91 and move the flap valve 90 to the solid line position at which it closes off the intake 84 and connects the intake 72 with the exhaust gas outlet 69. On the other hand, when the arm 77 is swung upward and rearward to retract auxiliary propeller 76, the initial movement will pull upon the link 92 to oppositely operate the bell-crank 91 and move the valve 90 upwardly to a position in which the intake 72 is isolated from the exhaust gas outlet 69 and intake 84 is connected thereto.

It will be apparent from the foregoing that in this system the auxiliary power may be utilized either for driving the auxiliary propeller 76 or the main propeller 65, at the will of the pilot or engineer in charge of the aircraft's flight. For example, it may be desirable to use the auxiliary turbine 83 to drive the main propeller 65 during low level flight at which time the propeller 65 may absorb the full power thus directed to it, whereas when the aircraft ascends to the higher levels it may be desired to put into use the auxiliary propeller 76 to provide added propeller blade area for the rarefied atmosphere there encountered. Neither auxiliary turbine 71 nor 72 will interfere with the operation of the other and only one is brought into play at any one time due to the automatic operation of the control valve 99. It may here be noted that in the case of multi-engine aircraft the exhaust gases from both inboard and outboard engines on either side may be conducted to a single auxiliary turbine if desired. It is also to be understood that the auxiliary propeller is preferably located outside of the slip stream of the main propeller.

Figure 5:
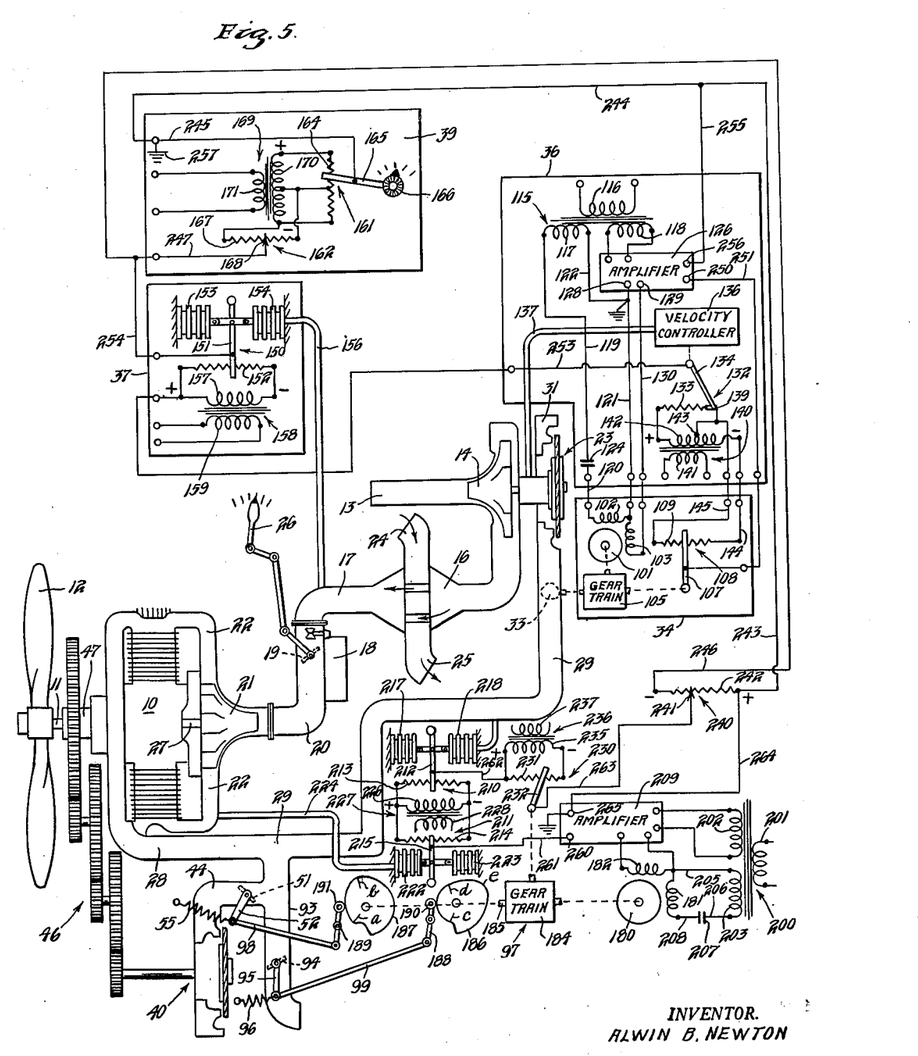
Figure 5 is a view similar to Figure 1 but illustrating a modification of the control system for the power recovering means and showing the apparatus in greater schematic detail.

*Figure 5*

In Figure 5 I have shown a form of my invention in which the exhaust back pressure is maintained constant for any given value of the intake manifold pressure and for any selected induction pressure. This results in more accurate control of the turbo discharge pressure. As with the other figures, corresponding reference numerals are employed to indicate corresponding elements. Inasmuch as the novel portion of the present invention involves cooperation with certain elements of the control apparatus for the motor positioning the waste gate of the main turbine, this control apparatus for this waste gate motor, which was shown boxed-in in the previous figures, is shown in somewhat schematic detail in the present figure.

Before referring to the control apparatus, the arrangement of the turbines in the present species will be considered. The auxiliary turbine 40, in this species, is by-passed by a conduit 93 leading from the conduit 44 which supplies gas to the turbine 40. Located within this by-pass conduit 93 is a waste gate 94 which is actuated by a lever arm 95 and is biased to closed position by a spring 96 engaging the operating arm 95.

A spring 55 in the present form biases the throttle valve 51 to closed position rather than to open position as in the form of Figure 2. A motor arrangement generally indicated at 97 is employed to position throttle valve 51 and waste gate 94 through a pair of links 98 and 99. The construction of the motor and the manner in which it positions the valves 51 and 94 will be described in more detail later.

It is to be noted that in this form of the apparatus, the main turbine 31 as well as the auxiliary turbine 40 is so disposed that the exhaust gas is discharged to the rear. The inlet 13 of the compressor 14 is disposed towards the front so that the air drawn into the turbine has a tendency to produce a forward movement of the aircraft. Similarly, the lower end of the waste conduit 93 associated with auxiliary turbine 40 is disposed so that the gas issuing from it is discharged to the rear. By disposing the various elements in the manner recited, an appreciable jet effect is obtained to aid the forward motion of the craft. While this disposition of the turbines has been illustrated only in connection with the form of Figure 5, it is to be understood that any of the turbines of the previously described figures may be so disposed.

Considering now the control apparatus for turbine 23 and referring first to the motor 34, this motor is shown as comprising a rotor 101 with which are associated two field windings 102 and 103. The motor is of the split phase type so that upon the current supplied to one winding being displaced 90° with respect to that supplied to the other winding, the motor will rotate in a direction depending upon whether the current through the one winding leads or lags that through the other winding. The rotor 101 is connected through a gear train 105 to the throttle valve 33. In order to simplify the illustration, the motor is shown as connected directly through a rotatable shaft to the throttle 33 instead of through a link such as link 35, as with the species of Figure 1. It is of course to be understood that the manner of connection of the motor to the throttle is not an essential feature of my invention. The gear train 105 is also connected to a slider 107 of a follow up potentiometer 108. The potentiometer comprises a resistor 109 with which the slider 107 is in sliding engagement. The terminals of the windings 102 and 103, the opposite terminals of resistor 109, and the slider 107 are connected to terminals on the motor housing corresponding to the terminals shown in Figure 1. In order to simplify the description, these terminals will not be referred to specifically by reference numerals and the various conductors leading to and from them will be considered as though the terminals did not exist, that is as though the conductors were continuous. This practice will be followed in connection with the other units of the apparatus.

The network and amplifier unit 36 comprises a transformer 115. This transformer comprises a primary winding 116 and a plurality of secondary windings 117 and 118. The secondary 117 is connected to the motor field winding 102 through conductors 119, 120, 121, and 122. A condenser 124 is connected between conductors 119 and 120. This condenser serves to displace the phase of the current flowing through winding 102 by 90°.

The winding 118 of transformer 115 is employed to supply power to an amplifier 126. This amplifier may be of any suitable type which supplies output current, the phase of which is dependent upon the phase of the input signal. A typical amplifier is that shown in the patent to Beers, 2,020,275. An amplifier particularly suitable for use in connection with my apparatus is shown in Figure 1 of the co-pending application of Albert P. Upton, Serial No. 437,561, filed April 3, 1942, now Patent No. 2,423,534.

The output terminals 128 and 129 of the amplifier are connected to the motor field winding 103 by conductors 121 and 130. The phase of the current supplied by amplifier 126 to winding 103 is reversed with reversal of the phase of the input voltage. Because of the condenser 124, the current supplied to winding 103 is thus either 90° ahead or 90° behind in phase with respect to that supplied to winding 102.

Also included with the network amplifier 36 is a potentiometer 132 comprising a resistor 133 and a slider 134. The resistor 133 is provided with a conductive bar 139 at its right-hand end and the slider 134 is normally in engagement with this conductive bar. The slider 134 is positioned by a velocity controller 136 which is connected by a flexible drive shaft 137 to the shaft of the turbine 23. The velocity controller 136 is effective whenever the turbine speed exceeds a predetermined value to move the slider 134 to the left by an amount dependent upon the time that the velocity exceeds such predetermined value. The details of this velocity controller are shown in the aforementioned Taylor patent.

Associated with the potentiometer 132 is a transformer 140. This transformer comprises a primary winding 141 and a secondary winding 142. The secondary winding is provided with an intermediate tap 143. The resistor 133 is connected between the left-hand terminal of secondary winding 142 and the tap 143. The right-hand terminal of resistor 109 of potentiometer 108 is connected by conductor 144 to the right-hand terminal of secondary winding 142, while the left-hand terminal of resistor 109 is connected by conductor 145 to tap 143.

It will be noted that the two potentiometers 108 and 132 together with the transformer 140 constitute a network analogous in many respects to a bridge. The sliders 107 and 134 constitute the output terminals of this network and a voltage appears across these sliders, the magnitude of which is dependent upon their relative positions. The network just described constitutes one of several series networks which collectively determine the voltage applied to the input of amplifier 126.

One of the additional networks is included within the pressure responsive controller 37. This controller comprises a potentiometer 150 which includes a slider 151 and a resistor 152. The slider 151 is connected to two opposed bellows members 153 and 154. The bellows member 154 is connected by a conduit 156 to the conduit 17 which is in turn connected to the inlet of carburetor 18. Bellows 154 is thus subjected to the induction system pressure. The bellows 153 is evacuated so that it is responsive only to atmospheric pressure. This bellows serves to compensate bellows 154 for the varying effect of atmospheric pressure on the latter. The slider 151 is accordingly positioned solely in accordance with the induction system pressure.

The resistor 152 is connected across a secondary 157 of a transformer 158. The transformer 158 comprises a primary winding 159. The network constituted by secondary 157 and potentiometer 150 produces a voltage measured between slider 151 and the left-hand terminal of secondary 157.

A further network is included within the pressure selector 39. This network includes two potentiometers 161 and 162. Potentiometer 161 comprises a resistor 164 and a slider 165. The slider 165 is connected to a knob 166 shown but not otherwise identified in Figure 1. The potentiometer 161 serves as a pressure selecting potentiometer and as will appear more clear from a later portion of the description, the movement of the knob 166 in the counterclockwise direction to move slider 165 serves to increase the induction system pressure that is maintained by the apparatus.

The potentiometer 162 comprises a resistor 167 and a slider 168 and acts as a calibrating potentiometer.

Associated with potentiometers 161 and 162 is a transformer 169 which comprises a secondary winding 170 and a primary winding 171. The opposite terminals of resistor 164 are connected to the opposite terminals of secondary 170, while the left-hand terminal of resistor 167 is connected to the lower terminal of secondary 170 and the right-hand terminal to a center tap of secondary 170. This center tap of secondary 170 is connected to a center tap of resistor 164 so as to cause the voltage drop across resistor 164 to be less affected by the variations in current flow therethrough due to the movement of slider 165.

Considering now the control equipment for the auxiliary turbine 40, the motor 97 comprises a rotor 180 with which are associated field windings 181 and 182. The motor is of the same type as motor 34, that is, the type in which the direction of rotation is dependent upon the relative phase position of the current supplied to windings 181 and 182.

The rotor 180 is connected through a gear train 184 to a cam shaft 185 carrying a pair of cams 186 and 187. Cooperating with the cams 186 and 187 are a pair of levers 188 and 189. The lever 188 has a cam follower roller 190 bearing against the cam 186, while the lever 189 has a similar roller 191 bearing against the cam 187. The springs 55 and 96 serve to maintain the levers 189 and 188 in cam-following engagement with the cams 187 and 186, respectively. The cam 187 is provided with a cam portion which increases in radius from a point $a$ to a point $b$, proceeding in a clockwise direction. From point $b$ the cam is of relative diameter. The cam 186 is of uniform radius from point $c$ to point $d$, these two points corresponding in angular position to points $a$ and $b$ on cam 187. From point $a$ to point $e$, the radius of cam 186 gradually increases, and from point $e$ back to a point closely adjacent the point $c$ the cam is of uniform radius again. It will thus be apparent that upon counter-clockwise rotation of cams 187 and 186 through the arc defined by points $a$ and $b$ on cam 187 and $c$ and $d$ on cam 186, the cam lever 189 is gradually moved in a counterclockwise direction to similarly rotate valve 51 towards open position against the biasing action of spring 55. Upon the cams 186 and 187 moving to the position where points $b$ and $d$ are in engagement with the contact rollers 191 and 190, valve 61 is in fully-open position, and since cam roller 191 is now engaging the portion of the cam 187 of uniform radius, continued movement of the cams in a clockwise direction results in no further movement of valve 51. Such continued motion does, however, cause a counterclockwise rocking of lever 188 to move valve 94 towards open position. Thus, as the cams are rotated in a clockwise direction, valve 51 is first moved to open position and then the waste gate valve 94 is moved towards its open position. Reverse movement of the cams, of course, causes reverse movement of valves 51 and 94.

A transformer 200 comprises a primary winding 201 and two secondary windings 202 and 203. The secondary winding 203 is connected to the field winding 181 of motor 97 through conductor 205, conductor 206, condenser 207, and conductor 208. The condenser 207 serves to displace in phase by 90° the current flowing through winding 181. The winding 182 is connected to the output terminals of an amplifier 209. This amplifier may be of the same general type as amplifier 126. The amplifier 209 is supplied with power by secondary 202, the output terminals of which are connected to the power terminals of the amplifier.

The voltage applied to the input terminals of amplifier 209 is determined by a plurality of series connected networks in much the same manner as in connection with amplifier 126. One of these networks includes two potentiometers 210 and 211. The potentiometer 210 comprises a slider 212 and a resistor 213. The potentiometer 211 comprises a resistor 214 and a slider 215. The slider 212 of potentiometer 210 is positioned by a pair of opposed bellows 217 and 218. The bellows 218 is connected to the interior of the exhaust conduit 29 leading to the turbine 23. The bellows 217 is evacuated so as to respond to purely atmospheric pressure, thus acting to compensate bellows 218 for the varying effect of atmospheric pressure on it. The slider 215 of potentiometer 214 is likewise positioned by a pair of opposed bellows 222 and 223. The bellows 222 is connected by a conduit 224 to the intake manifold 22 so as to respond to intake manifold pressure. Bellows 223 is evacuated and compensates the bellows 222 for variations in atmospheric pressure. The resistors 213 and 214 of potentiometers 210 and 211 are connected to the opposite terminals of the secondary 226 of a transformer 227. Transformer 227 comprises in addition to the secondary 226 a primary winding 228.

The reference numeral 230 is employed to designate a further potentiometer comprising a resistor 231 and a slider 232. The slider 232 is connected to gear train 184 so as to be positioned by the motor 97. The potentiometer 230 constitutes a follow up potentiometer. The opposite terminals of resistor 231 are connected to the opposite terminals of a secondary 235 of a transformer 236 having a primary winding 237.

A potentiometer 240 comprises a slider 241 and a resistor 242. The right-hand terminal of resistor 242 is connected by conductors 243, 244, and 245 to the slider 165, while the left-hand terminal of resistor 242 is connected by conductors 246 and 247 to the slider 168. It will be recalled that the sliders 165 and 168 constitute the output terminal of the network including potentiometers 161 and 162. The voltage appearing across this network is thus impressed across resistor 242. A variable portion of the voltage is introduced into the series of networks controlling the input voltage to amplifier 209.

While the transformers 115, 140, 156, 169, 200, 227 and 236 have been shown as separate transformers, this has been done to group the secondaries more closely with the equipment energized by them. In actual practice, the secondary windings could all be disposed on one or a small number of transformers. In any event, where more than one transformer is used, all of the primary windings should be connected to a common source of alternating voltage.

*Operation of Figure 5*

The voltage applied to the input terminals of amplifier 126 is determined, as previously noted, by a plurality of networks. The path through these networks may be traced as follows: from the lower input terminal 250 through conductor 251, the slider 107, the network including potentiometers 108 and 132, slider 134, conductor 253, the left hand portion of resistor 152, slider 151, conductors 254 and 247, the network including potentiometers 162 and 161 and conductors 245, 244, and 255 to the upper input terminal 256. It will be noted that conductor 245 is grounded at 257 so that the amplifier terminal 256 is at ground potential.

In considering the operation of the system, it will be assumed that the upper terminal of secondary 170, the left hand terminal of secondary 157, and the left hand terminal of secondary 142 are positive with respect to the opposite terminals of the respective secondaries during the same half-cycle as indicated by the legends appearing on the drawings. With the sliders in the position shown and during the half cycle being considered, the slider 107 is negative with respect to the slider 134, the left hand terminal of secondary 157 is positive with respect to the slider 151, and the slider 168 is negative with respect to slider 165. Thus, the voltage output of the network constituted by potentiometers 108 and 132 and that of the network including potentiometers 161 and 162 is opposed by the network including potentiometer 150. It will be assumed that the relative values of these voltages are such that the voltages cancel each other out so that no voltage exists between the amplifier terminals 256 and 270. Under these conditions, no current is supplied to winding 103 and the motor is unable to rotate. It is assumed that under these conditions the throttle valve 33 is in intermediate position at which the air supplied to the induction system by the compressor 14 is sufficient to maintain the desired induction system pressure.

Let it be assumed that the induction system pressure falls, thus necessitating a greater compressing action upon the part of compressor 14. The effect of this reduction in pressure is to cause slider 151 to move to the left with respect to resistor 152. This causes a greater voltage to exist between the left hand terminal of resistor 152 and slider 151. Considering the half cycle just considered, the effect of this is to cause the input terminal 250 of amplifier 126 to become positive with respect to the input terminal 256 during the half-cycle being considered. In terms of alternating current, this results in an alternating voltage of a predetermined phase being applied to the input terminals 250 and 256. This in turn causes amplifier 126 to supply an alternating voltage of a predetermined phase to the motor winding 103. The system is so designed that the phase of this current with respect to that supplied to winding 102 is such as to cause the throttle valve 33 to move towards open position to permit more exhaust gas to be supplied to the turbine 31. Motor 34 in so moving, causes slider 107 to move to the right; that is, towards the negative end of the resistor. This increases the output voltage of the network including resistor 108 which, it will be recalled, opposes the network including potentiometer 150. Thus, after the slider 107 has been moved a predetermined amount corresponding to the change in induction system pressure, the system will again be balanced so that the throttle valve motor 34 will no longer be operated.

In the event of a rise in induction system pressure, the slider 151 is operated in the opposite direction with the result that the voltage supplied to input terminals of amplifier 126 is opposite in phase to that previously considered. The effect of this is to cause the amplifier 126 to supply current to motor winding 103 which is likewise opposite in phase. This causes rotation of the motor 101 in the direction opposite to that previously considered to cause the movement of the throttle valve 33 towards closed position and a movement of slider 107 of the follow up potentiometer 108 towards the left. Again, the movement of slider 107 is in a direction to rebalance the series of networks to cease operation of the motor 34. The operation of the rest of the control apparatus for motor 34 will not be described in detail. As previously mentioned, this apparatus is described in the above mentioned Taylor patent and for a clear understanding of the invention, reference may be made to that application. In general, a movement of the manually positioned slider 165 downwardly has the same effect upon the unbalance voltage as the movement of slider 151 of the potentiometer 150 to the left; that is, to increase the compressing effect of compressor 14. Thus, movement of slider 165 downwardly by rotation of knob 166 in a counter-clockwise direction increases the induction system pressure maintained by the system. The potentiometer 162, as previously noted, is used to initially calibrate the apparatus. Movement of the slider 168 to the right increases the induction system pressure and to the left decreases the same.

The velocity controller 136 is effective whenever the velocity of the shaft of turbine 23 rises above a predetermined value to move slider 134 to the left. The effect of this is the same in direction as that occurring when slider 151 moves to the left. In other words, the movement of slider 134 to the left decreases the amount of exhaust gas supplied to the turbine 23 and hence decreases the speed of operation of compressor 14.

It will thus be seen from the above that the control apparatus for motor 34 serves to so position the throttle valve 33 that there is maintained in the induction system 17, a pressure equal to that selected by the network including pressure selecting potentiometer 161 and calibrating potentiometer 162. The only exception to this is when the velocity controller 136 responds to the presence of an overspeed condition in which case, the speed of the compressor 14 is reduced regardless of the demand of the rest of the system.

As previously noted, the species of this figure provides means for controlling the pressure in the exhaust conduit 29 by supplying varying amounts of exhaust gas to the auxiliary turbine 40. The amplifier which controls the operation of motor 97 positioning valves 94 and 51 is controlled by a series of networks which may be traced as follows: from the lower input terminal 260 of amplifier 209 through conductor 261, the network including potentiometers 210 and 211, conductor 262, the left hand portion of resistor 231, slider 232, conductor 263, slider 241, resistor 242, and conductor 264 to the grounded input terminal 265 of amplifier 209. The voltage applied to the amplifier 209 is thus the sum of the voltage output of the bridge including potentiometers 210 and 211, the voltage existing across the left hand portion of potentiometer 231 and the voltage existing between the slider 241 and the right hand terminal of resistor 242. It may be again pointed out at this point that the voltage existing across 242 is that determined by the output voltage of the bridge consisting of pressure selecting potentiometer 161 and calibrating potentiometer 162. The slider 241 is provided for the purpose of determining what portion of this voltage is introduced into the input circuit of amplifier 209. In considering the operation of the networks, the conditions during a half cycle will again be considered. The same half cycle will be considered as was considered in connection with the operation of amplifier 126. Thus, the voltage across the resistor 242 will be that indicated by the legends; that is, the right hand terminal of resistor 242 will be positive with respect to the left hand terminal. The primaries are so connected to the common source of power that during this half cycle, the left hand terminal of secondary 235 is positive with respect to the right hand terminal. Similarly, the left hand terminal of secondary 226 is also positive with respect to its right hand terminal. Considering first the bridge consisting of potentiometers 210 and 211, it will be noted that the two sliders 215 and 212 are centrally disposed with respect to their associated resistors and with respect to the secondary winding 226 so that no voltage exists between these two sliders. Considering now the effect of potentiometer 230, it will be noticed that conductor 262 is positive with respect to slider 232. The slider 232 is in turn connected to slider 241 which is negative with respect to the right hand terminal of resistor 242. The voltages introduced by potentiometers 230 and 240 thus oppose each other. It will be assumed that the value of secondary 235 is such that these voltages exactly balance each other so that no voltage is applied to amplifier 209. Under these conditions, the throttle valve 51 is partially open so that the turbine 40 is operating at partial capacity. Now let it be assumed that the pressure within the exhaust manifold rises either due to an increase in the supply of exhaust gas or to a decreased demand by turbine 31. Under these conditions, the slider 212 will move to the left so that this slider becomes positive with respect to slider 215. The effect of this is to cause terminal 260 to become negative with respect to terminal 265. When this happens, the amplifier 209 is effective to supply to winding 182 an alternating current which is of such phase with respect to that supplied winding 181 that the motor 97 is effective to rotate the cams 186 and 187 in a counter-clockwise direction. The movement of cam 186 in a counter-clockwise direction has no effect upon the cam follower 190 due to the fact that the portion of the cam engaged by it at this time is of uniform diameter. The motion of cam 187 in a counter-clockwise direction, however, results in the lever 189 being rocked in a counter-clockwise direction to cause valve 51 to move towards open position. This permits more gas to flow to the turbine 40 to increase the power supplied by it to the main propeller 12. The increase in the amount of gas supplied to turbine 40 causes a decrease in the pressure within the exhaust gas conduit 29. At the same time, the slider 232 is moved to the left so as to tend to make terminal 260 less negative with respect to grounded terminal 265. Upon slider 232 moving sufficiently to the left, the network will again be balanced, with the result that the motor 97 is no longer energized in such a manner as to cause movement thereof.

Now let it be assumed that due to the change in position of valve 51 or for any other reason, the exhaust gas pressure within conduit 29 falls below the value which it is desired to maintain. Under these conditions, slider 212 will move to the right, causing terminal 260 of amplifier 209 to become positive with respect to grounded terminal 265. This causes a reversal in the phase of the voltage applied to the input terminals of amplifier 209 and hence a reversal in phase of the current supplied to winding 182. This causes motor 97 to operate in the opposite direction to move valve 51 towards closed position. At the same time, slider 232 is moved to the right to tend to make terminal 260 less positive with respect to terminal 265 and hence to rebalance the system.

Assuming again for the moment that the pressure in conduit 29 continues to rise, the valve 51 is progressively opened until it is completely open. At this time, the cam followers 190 and 191 will be in engagement with their respective cams at points d and b, respectively. Upon a further rise in exhaust gas pressure, it is necessary to provide for a greater escape from the conduit 29 if the exhaust gas pressure within conduit 29 is to be maintained at the desired value. This is accomplished by the opening of valve 94. As the cam 186 rotates in a clockwise direction beyond the point where cam follower 190 is in engagement with point d, the waste gate valve 94 is moved towards open position. This continues until point e is reached at which the waste gate valve 94 is fully open. Since the by-pass conduit 93 is open to atmosphere, the opening of waste gate 94 to even a relatively slight amount is normally all that is necessary to reduce the exhaust gas pressure within conduit 29 to the desired value. It is thus possible with the apparatus to insure a constant exhaust gas pressure within conduit 29 under all conditions. It is, of course, to be understood that normally the turbine 40 is able to utilize all of the exhaust gas that can be safely diverted from conduit 29 and it is only under exceptional circumferences that the gate 94 is moved towards open position.

It is desirable to increase the gas pressure within the conduit 29 when a higher induction system pressure is to be maintained. The reason for this is that in order to maintain a greater induction system pressure, assuming the atmospheric pressure to remain the same, it is necessary to have a greater exhaust gas pressure. It is for this reason that I apply a portion of the voltage across the network including the pressure selecting potentiometer 161 and the calibrating potentiometer 162, to the amplifier 269. It will be recalled that this is accomplished by the potentiometer 240. The extent of this portion of this voltage that is applied to amplifier 269 is determined by the position of slider 241. For any given position of this slider 241, if the pressure selector potentiometer 165 is changed by rotation of knob 166, the voltage existing between slider 241 and the right hand terminal of resistor 242 is likewise changed. For example, assuming that the knob 166 is rotated in a counter-clockwise direction to increase the induction system pressure that is maintained by the turbo supercharger control apparatus, the effect of this will be to decrease the voltage existing between slider 241 and the right hand terminal of resistor 242. This will cause terminal 260 to become positive with respect to terminal 265 of amplifier 269. The effect of this, it will be recalled, is to cause motor 74 to be energized in such a direction as to cause a clockwise rotation of cams 187 and 183. This will in turn cause throttle valve 51 to move towards closed position to increase the pressure maintained within conduit 29. Again, the slider 232 will be moved to the left to decrease the voltage introduced by potentiometer 233. Upon a predetermined movement of slider 232, the series connected networks will again be balanced so that no voltage is applied to the input terminals 260 and 265. The system will now continue to operate to maintain a higher pressure within conduit 29 then previously existed.

In the present form, I have also provided means for decreasing the pressure which is maintained in the exhaust gas conduit 29 when the intake manifold pressure increases. An increase in intake manifold pressure indicates, all other things remaining unchanged, that the exhaust gas pressure is greater than necessary. The potentiometer 211 is effective to introduce this compensation. Let it be assumed that there is a rise in intake manifold pressure. The effect of this is to cause the movement of slider 215 to the right which causes amplifier terminal 260 to become negative with respect to grounded terminal 265. This results in the motor 97 being operated in such a manner as to move the throttle valve 51 towards open position to increase the gas flow through the auxiliary turbine 40 and hence to decrease the pressure within the exhaust gas conduit 29, assuming all other things remain equal. This will in turn tend to cause a decrease in the compressing effect of compressor 14 and hence a decrease in the intake manifold pressure. It will be obvious that a decrease in the intake manifold pressure has the opposite effect; that is, of moving valve 51 towards closed position to increase the exhaust gas pressure within conduit 29. In either the case of an increase or decrease in the intake manifold pressure, the rebalancing potentiometer 230 is, of course, effective to rebalance the network.

It will be seen that with the arrangement of this figure, the auxiliary turbine is employed not only to obtain additional power that would otherwise be wasted but also to improve the operation of the main turbine control system in maintaining within the exhaust gas conduit a pressure such as to tend to cause proper operation of the turbine.

It will be obvious that numerous other modifications may be made within the spirit and scope of the appended claims.

I claim as my invention:

1. In a power plant, the combination with an engine having a supercharging compressor driven by a first gas operated power means actuated by exhaust gases from the engine and having a conduit leading said gases to said first power means, of a throttle valve in said conduit for controlling the flow of exhaust gases through said first power means, a second gas operated power means connected to the conduit to receive exhaust gases therefrom at the upstream side of said valve, a second valve for controlling the flow of exhaust gases through said second power means, a waste outlet connected to the conduit between the two valves, a third valve located in said waste outlet, and means responsive to exhaust gas pressures in the conduit for operating the second and third valves sequentially.

2. In a power plant, a combustion chamber, means for supplying a fuel mixture thereto, a first gas turbine powered by exhaust gas from the combustion chamber and having a conduit leading said gas from said combustion chamber to said turbine, a second gas turbine connected to said conduit, a compressor driven by said first turbine for supplying compressed air to said fuel mixture means, and means for controlling the pressure of the air supplied to said fuel mixture means, said last named means comprising means responsive to the pressure of the gas in said conduit for varying the flow of gas therefrom through said second turbine to maintain a predetermined pressure in said conduit, and means responsive to the pressure of said compressed air for varying the flow of gas from said conduit through said first turbine.

3. In a power plant; a combustion chamber; means for suppling a fuel mixture thereto; a first gas turbine powered by exhaust gas from the combustion chamber and having a conduit leading said gas to said turbine; a second gas turbine connected to said conduit; a compressor driven by said first turbine for supplying compressed air to said fuel mixture means; and means for controlling the pressure of the air supplied to said fuel mixture means, said last named means comprising first pressure responsive means responsive to a power plant exhaust pressure for maintaining a predetermined pressure in said conduit by varying the flow of gas therefrom through said second turbine, and second pressure responsive means responsive to the pressure of said compresed air for varying the flow of gas from said conduit through said first turbine, and means for simultaneously adjusting said first and second pressure responsive means to vary the pressure of the air supplied to said fuel mixture means.

4. In a power plant; a combustion chamber; means for supplying a fuel mixture thereto; a first gas turbine powered by exhaust gas from the combustion chamber and having a conduit leading said gas to said turbine; a second gas turbine connected to said conduit; a compressor driven by said first turbine for supplying compressed air to said fuel mixture means; and means for controlling the pressure of the air supplied to said fuel mixture means, said last named means comprising first pressure responsive means responsive to a power plant exhaust pressure for maintaining a predetermined pressure in said conduit by varying the flow of gas therefrom through said second turbine, and second pressure responsive means responsive to the pressure of said compressed air for varying the flow of gas from said conduit through said first turbine, and third pressure responsive means responsive to the pressure of the fuel mixture for adjusting said first pressure responsive means.

5. In combination, a combustion engine having intake and exhaust conduits, a turbine driving a supercharger positioned in said intake conduit to supply compressed air to said intake conduit at a rate determined by the flow of gas through said turbine from said exhaust conduit, a carburetor, an engine driven compressor, means connecting said carburetor and said engine driven compressor in the order named between said supercharger and said engine in said intake conduit, first valve means positioned in said exhaust conduit between said engine and said turbine to vary the flow of gases through said turbine, first pressure responsive means responsive to the pressure in said intake conduit between said carburetor and said supercharger, means including said first pressure responsive means for varying the position of said first valve means to maintain a desired pressure between said carburetor and said supercharger, second valve means located in said exhaust conduit for by-passing the exhaust gases not needed by said turbine, second pressure responsive means responsive to the pressure between said second valve means and said first valve means, and means including said second pressure responsive means for varying the position of said second valve means to maintain a desired pressure between said second valve means and said first valve means.

6. In combination, a combustion engine having intake and exhaust conduits, a turbine driving a supercharger positioned in said intake conduit to supply compressed air to said intake conduit at a rate determined by the flow of gases through said turbine in said exhaust conduit, a carburetor, an engine driven compressor, means connecting said carburetor and said engine driven compressor in the order named between said supercharger and said engine in said intake conduit, first valve means positioned in said exhaust conduit between said engine and said turbine to vary the flow of gases through said turbine, first pressure responsive means responsive to the pressure in said intake between said carburetor and said supercharger, means including said first pressure responsive means for variably positioning said first valve means to maintain a desired pressure between said carburetor and said supercharger, second valve means located in said exhaust conduit for by-passing the exhaust gases not needed by said turbine, second pressure responsive means responsive to the pressure between said second valve means and said first valve means, motor means positioning said second valve means in accordance with the pressure sensed by said second pressure responsive means, third pressure responsive means sensitive to the pressure between said engine driven compressor and said engine, and means including said third pressure responsive means for controlling said motor means.

7. In combination with a combustion engine having an engine driven compressor and an exhaust turbine driven supercharger operating in series with a carburetor in the engine manifold induction system so that air enters the engine through the supercharger, carburetor, engine driven compressor, and manifold, sequentially, and an exhaust conduit with first valve means to regulate the flow of gases through the turbine of the supercharger and a by-pass valve means in addition to the first valve means to by-pass the gases not needed by the turbine located between the engine and the turbine; control apparatus comprising first pressure responsive means sensitive to the pressure of the intake of the carburetor, a first actuator for positioning the first valve means, means operatively connecting said first pressure responsive means to said first actuator to maintain a desired pressure on the intake of the engine manifold, a manually operated pressure switch selector for adjusting the operative relation between said responsive means and said first actuator, a second pressure responsive means sensing the exhaust pressure between the by-pass valve means and the first valve means, a second actuator for positioning the by-pass valve means, means operatively connecting said second pressure responsive means to said actuator, and means connecting said pressure selector to adjust the operative relation between said second pressure responsive means and said second actuator.

8. In combination with a combustion engine having an engine driven compressor and an exhaust turbine driven supercharger operating in series with a carburetor in the engine manifold induction system so that air enters the engine through the supercharger, carburetor, engine driven compressor, and manifold, sequentially, and an exhaust conduit with a control valve to regulate the flow of gases through the turbine of the supercharger and a by-pass valve means in addition to the control valve to by-pass the gases not needed by the turbine and located between the engine and the turbine; control apparatus comprising a first actuator for positioning the control valve, first pressure responsive means sensitive to the pressure of the intake of the carburetor, means operatively connecting said first pressure responsive means in controlling relation to said first actuator to maintain a predetermined pressure on the intake of the carburetor, a manually operated pressure selector for variably adjusting the operative relation between said first actuator and said first pressure responsive means, a second pressure responsive means responsive to the pressure in the engine exhaust conduit between the by-pass valve means and the control valve, a second actuator for positioning the by-pass valve means operatively controlled by said second pressure responsive means, means including said pressure selector for variably adjusting the operative relation between said second pressure responsive means and said second actuator, a third pressure responsive means sensitive to intake manifold pressure, and means including said third pressure responsive means for variably adjusting the operative relation between said second responsive means and said second actuator upon changes in intake manifold pressure.

ALWIN B. NEWTON.

REFERENCES CITED

The following references are of record in the file of this patent:

UNITED STATES PATENTS

| Number | Name | Date |
|---|---|---|
| 1,816,787 | Moss | July 28, 1931 |
| 2,245,163 | Smith | June 10, 1941 |
| 2,283,175 | Berger | May 19, 1942 |
| 2,306,277 | Oswald | Dec. 22, 1942 |
| 2,373,139 | Morris | Apr. 10, 1945 |
| 2,378,441 | Silvester | June 19, 1945 |
| 2,385,366 | Lysholm | Sept. 25, 1945 |
| 2,402,725 | Birkigt | June 25, 1946 |
| 2,411,227 | Planiol | Nov. 19, 1946 |
| 2,422,744 | O'Neil | June 24, 1947 |
| 2,428,830 | Birmann | Oct. 14, 1947 |
| 2,454,588 | Baak | Nov. 23, 1948 |
| 2,474,203 | Sparrow | June 21, 1949 |
| 2,480,621 | Warner | Aug. 30, 1949 |
| 2,491,380 | Kutzler | Dec. 13, 1949 |
| 2,493,476 | Crum | Jan. 3, 1950 |

FOREIGN PATENTS

| Number | Country | Date |
|---|---|---|
| 479,822 | Great Britain | Feb. 11, 1938 |
| 513,751 | Great Britain | Oct. 20, 1939 |
| 585,208 | France | Feb. 23, 1925 |
| 833,632 | France | Oct. 26, 1938 |